Figure 1:
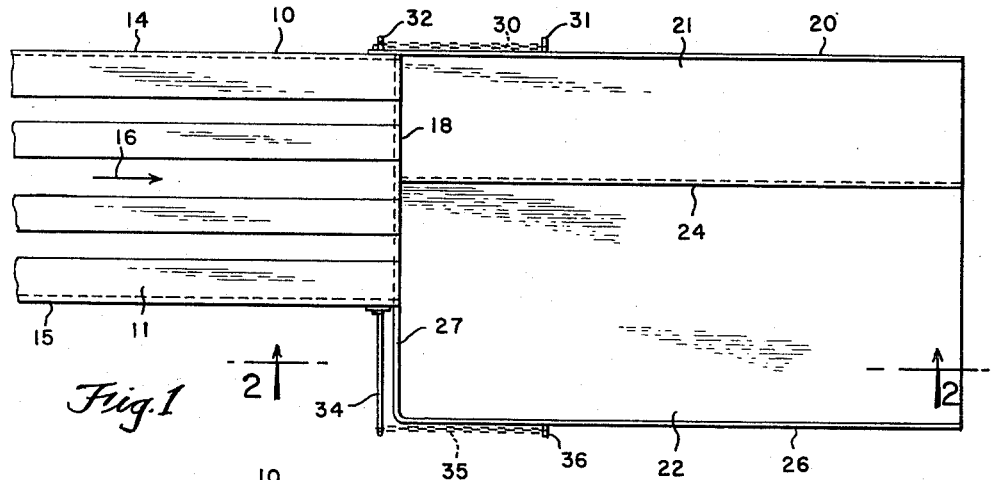

Dec. 15, 1964  J. H. SHEPLEY ETAL  3,161,008

DISCHARGE DEVICE

Filed April 16, 1963

INVENTORS
JOHN H. SHEPLEY &
PHILIP N. BUCHER
BY Joseph A. Brown
ATTORNEY

United States Patent Office 3,161,008
Patented Dec. 15, 1964

3,161,008
DISCHARGE DEVICE
John H. Shepley and Philip N. Bucher, Lancaster, Pa., assignors to Sperry Rand Corporation, New Holland, Pa., a corporation of Delaware
Filed Apr. 16, 1963, Ser. No. 273,525
5 Claims. (Cl. 56—474)

This invention relates generally to chutes for hay balers and more particularly to a baler chute adapted to properly position bales when discharging them onto the ground.

In a conventional hay baler, the bale case in which bales are formed extends parallel to the direction of ground travel. As the baler operates, the bales are progressively formed and discharged rearwardly one after the other. The baler is provided with a chute to receive and discharge each bale onto the ground.

Manually gathering hay bales from a field is a very laborious tasks. Therefore, various mechanical pickup machines have been provided. One such machine is shown in Grey U.S. Patent No. 2,848,127 issued August 19, 1958. The machine shown in such patent operates in a field at high speed to pick up bales and to automatically stack them. For the machine to operate at proper efficiency, it is necessary that the bales to be picked up be positioned in a line and each bale must be in the same relative position to the ground. Specifically, it is necessary that the wire or twine which bands the bale be extending in a horizontal plane. Most balers presently in use band the bales when they are tied with strands of wire or twine extending in vertical planes. Therefore, as each bale is discharged from the baler, it is necessary to turn the bale a quarter turn before dropping the bale onto the ground.

Lateral flip-over bale chutes have been provided to produce a quarter turn for a bale at discharge. However, such chutes generally do not produce results which are uniformly correct. Depending to a certain extent on the terrain over which the baler is operated and the frequency of turns, sometimes the bale chute will flip the bale over more than a quarter turn when the bale is discharged. A situation results where some of the bales become properly positioned while other bales have turned over more than desired. It is necessary for the operator to go through the field and manually turn over the bales which are out of position so that their tying strands extend in horizontal planes and to locate the bales in a line. This manual positioning of bales takes time, physical effort and substantially adds to the expense of the overall baling operation.

A main object of this invention is to provide a bale chute which will produce a quarter turn of the bale as it emerges from the bale case of the baler and positively prevents further turning of the bale before deposit on the ground.

Another object of this invention is to provide a novel method for handling bales as they are discharged from a baler to thereby position the bales in desired relationship to the ground.

Another object of this invention is to provide a two section bale chute which will receive a bale, tip it over a quarter turn, and then hold the bale for subsequent discharge upon the ground.

Another object of this invention is to provide a bale chute of the character described wherein a bale is received on one section of a bale chute, toppled onto a second section and then removed from the second section responsive to the emergence of the next bale.

A further object of this invention is to provide a bale chute of the character described which will positively insure that each bale discharged from a baler will be turned over a quarter turn, no more and no less.

A still further object of this invention is to provide a bale chute which is relatively simply designed and constructed whereby it may be manufactured and sold at a low cost.

Other objects of this invention will be apparent hereinafter from the specification and from the recital in the appended claims.

Figure 2:
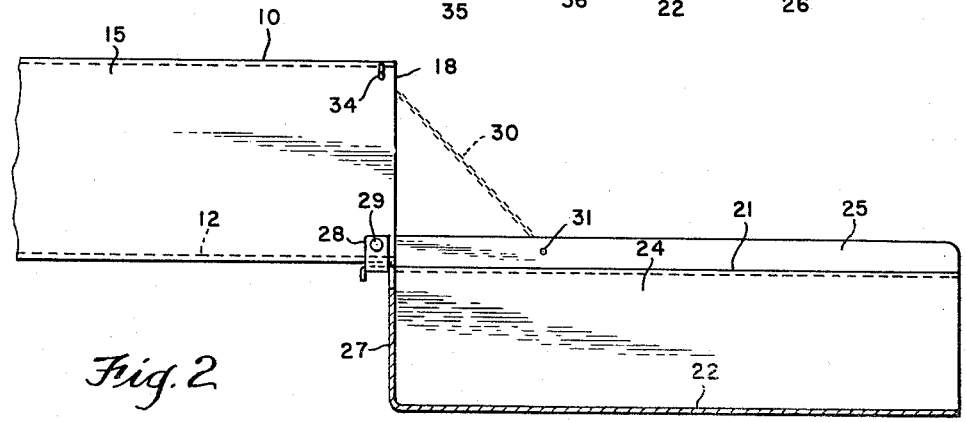
Figure 3:
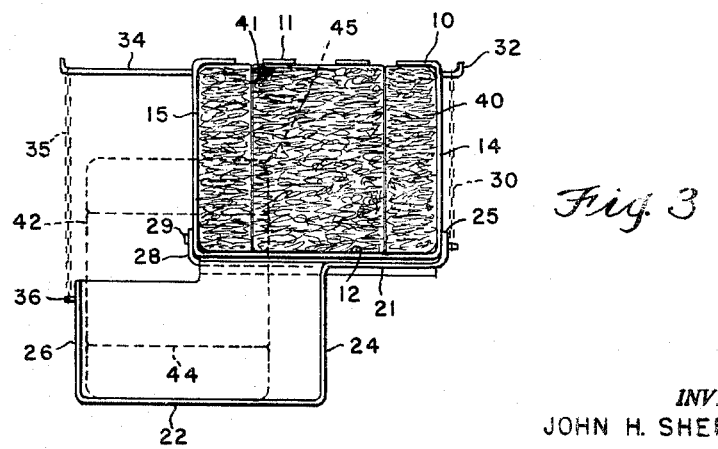

In the drawing:
FIG. 1 is a plan view of the discharge end of a bale case of a hay baler having mounted thereon a bale chute constructed according to this invention;
FIG. 2 is a part side elevation, part vertical section taken on the line 2—2 of FIG. 1 looking in the direction of the arrows; and
FIG. 3 is an end view of the bale case and bale chute looking from right to left of FIG. 2.

Referring now to the drawing by numerals of reference, 10 denotes a bale case having a top wall 11, a bottom wall 12 and spaced vertically extending side walls 14 and 15. Bales formed in bale case 10 progressively move in the direction indicated by the arrow 16 in FIG. 1 for discharge from the rearward end 18 of the bale case. As each bale emerges from bale case 10, it moves progressively outwardly in increments of several inches. The amount of bale movement is related to the amount of hay being picked up by the baler and the quantity of material added to the bale being formed with each working stroke of the baler plunger. The particular bale being discharged is pushed from the bale case by the next bale following it.

Mounted on bale case 10 to receive the bales is a turnover bale chute 20 having a first horizontal section 21 and a second horizontal section 22. These sections extend parallel to each other and in the same longitudinal direction as bale case 10. Section 21 is located as an extension of bale case bottom wall 12 and it is located along the side of the bale case adjacent side wall 14. The second chute section 22 extends in a plane lower than first section 21 and it is located beneath side wall 15, FIG. 3. Bale chute sections 21 and 22 are interconnected by a vertical wall 24. The side of chute section 21 adjacent side wall 14 has an upturned longitudinal flange 25 which serves to guide each emerging bale and prevent movement in a lateral direction away from second chute section 22. The side of chute section 22 remote from wall 24 is provided with an upstanding wall 26 which also extends longitudinally and the forward end of the second chute section has a wall 27.

For mounting bale chute 20 on the bale case 10, chute brackets 28 are provided and connected by pivot pins 29 to the side walls 14 and 15 of the bale case. The chute is thus swingable about a transverse axis to move it from a normal down position as shown best in FIG. 2 to a retracted elevated transport position, not shown. For holding the chute in normal position, a first chain 30 is provided and connected between flange 25 of the bale chute and to pin 32 on side wall 14 of the bale case. At the opposite side of the bale case is an arm 34 which projects laterally from the top wall 11. A chain 35 is connected to arm 34 and the chain extends downwardly and rearwardly therefrom to a pin 36 on chute wall 26. The chute is thus maintained in stable rearward projecting position from the bale case 10 and swingable about the pivot pins 29 to a retracted position.

As shown in FIGS. 1 and 3, the first section 21 of the bale chute 20 is of a width narrower than one half the width of the bales 40 being discharged from the bale case 10. The second bale chute section 22 is wide enough to support a bale. In operation, when a bale 40 emerges from the bale case 10, the bands 41 around the bale extend in vertical planes. As the bale emerges it slides along bale chute section 21. When bale 40 is free of the bale case 10, it topples laterally onto second chute section 22. Chute section 22 is so spaced below chute section 21 that the bale is allowed a one quarter turn only as it comes from the first chute section. Further turning of the bale is prevented by the upstanding side wall 26 on chute section 22.

After the bale has toppled from the first chute section 21 to the second chute section 22 the bale, denoted 42, is positioned as shown by the dotted lines with the tying bands 44 horizontal. Bale 42 projects upwardly from section 22 above the level of chute section 21. In such locations, the portion 45 of the bale is in the path of the next bale emerging from the bale case. Thus, as the next bale progressively discharges from bale case 10, it pushes bale 42 longitudinally along chute section 22 for deposit on the ground. Each bale is thus discharged longitudinally and the bales are deposited in a substantially straight line. Moreover, the bands of wire or twine extending around the bale in vertical planes as the bale emerges are now located in horizontal planes. Thus, when the bale ultimately lands on the ground, the tying bands extend in horizontal planes and suitable for pickup by an automatic bale retriever.

The structure described maintains proper control of each discharged bale to produce a one quarter turn over, no more, no less. A turn over in excess of one quarter is not possible. Thus, the chute provides a desired result with a structure which is relatively simple and inexpensive.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A bale chute attachable to the bale case of a baler to receive each bale progressively discharged therefrom, to topple each bale laterally a quarter turn and then support each bale for longitudinal movement and deposit onto the ground, comprising a first chute section and a second chute section extending generally parallel to each other and in different horizontal planes, means connecting said first section to said bale case as an extension of the bottom thereof and along one side of the bale case, means connecting said second section to said bale case along the opposite side thereof and spaced below said first section, said first section being unobstructed and of such narrow width that each bale when deposited thereon free of the bale case topples laterally onto said second section for support thereby, means on said second section along the side thereof remote from said first section to prevent each bale from falling laterally of said second section and preventing each bale from turning over more than a quarter turn, each bale when supported on said second section projecting above said first section and in the path of the next bale to be discharged from the bale case whereby the next bale progressively pushes the bale on said second section longitudinally for discharge rearwardly onto the ground.

2. A bale chute attachable to the bale case of a baler to receive each bale progressively discharged therefrom, to topple each bale laterally a quarter turn and then support each bale for longitudinal movement and deposit onto the ground, comprising a first chute section and a second chute section extending generally parallel to each other and in different horizontal planes, means connecting said first section to said bale case as an extension of the bottom thereof and along one side of the bale case, means connecting said second section to said bale case along the opposite side thereof and spaced below said first section, said first section being unobstructed and of such narrow width that each bale when deposited thereon free of the bale case topples laterally onto said second section for support thereby, an upright side wall on said second section along the side thereof remote from said first section to prevent each bale from falling laterally of said second section and preventing each bale from turning over more than a quarter turn, each bale when supported on said second section projecting above said first section and in the path of the next bale to be discharged from the bale case whereby the next bale progressively pushes the bale on said second section longitudinally for discharge rearwardly onto the ground.

3. A bale chute attachable to the bale case of a baler to receive each bale progressively discharged therefrom, to topple each bale laterally a quarter turn and then support each bale for longitudinal movement and deposit onto the ground, comprising a first chute section and a second chute section extending generally parallel to each other and in different horizontal planes, means pivotally connecting both of said sections to said bale case, said first section being located as an unobstructed extension of the bottom of said bale case and along one side thereof, flexible means connecting said first chute section in a normal given position relative to the bale case, said first section being of such narrow width that each bale when deposited thereon free of the bale case topples laterally onto said second section for support thereby, an upright side wall on said second section along the side thereof remote from said first section to prevent each bale from falling laterally of said second section and preventing each bale from turning over more than a quarter turn, each bale when supported on said second section projecting above said first section and in the path of the next bale to be discharged from the bale case whereby the next bale progressively pushes the bale on said second section longitudinally for discharge rearwardly onto the ground, and flexible means connecting said second section side wall to said bale case to support the second section in a given normal position.

4. A bale chute as recited in claim 3 wherein the side of said bale case opposite said one side has a laterally projecting arm and said flexible connecting means for said second section wall being attached thereto.

5. A method for discharging bales from a hay baler wherein the bales are tied with bands extending vertically and the bales are discharged rearwardly one after the other from the baler bale case, comprising turning a bale laterally a quarter turn after the bale is discharged free of the bale case, then slidably supporting the bale so turned in the path of the next bale being discharged so that the next bale will push the turned bale longitudinally for deposit on the ground with the bale bands extending horizontally.

References Cited by the Examiner
UNITED STATES PATENTS 2,529,842  11/50  Jones et al. _____ 56—473.5
2,853,171  9/58   Matthews _____ 193—43

WALTER A. SCHEEL, *Primary Examiner.*
A. H. NIELSEN, *Examiner.*